US012805445B2

(12) United States Patent
Ubaldi et al.

(10) Patent No.: US 12,805,445 B2
(45) Date of Patent: Nov. 24, 2026

(54) WINDROW MERGER AND METHOD FOR FORMING WINDROWS THROUGH A WINDROW MERGER WHICH COLLECTS AGRICULTURAL PRODUCTS FROM A FIELD

(71) Applicant: ROC S.R.L., Poggio Torriana (IT)

(72) Inventors: Raffaele Ubaldi, Rimini (IT); Stefano Ubaldi, Rimini (IT)

(73) Assignee: ROC S.R.L., Poggio Torriana (IT)

( * ) Notice: Subject to any disclaimer, the term of this patent is extended or adjusted under 35 U.S.C. 154(b) by 349 days.

(21) Appl. No.: 18/523,736

(22) Filed: Nov. 29, 2023

(65) Prior Publication Data

US 2024/0180081 A1 Jun. 6, 2024

(30) Foreign Application Priority Data

Dec. 1, 2022 (IT) ........................ 102022000024819

(51) Int. Cl.
*A01D 80/00* (2006.01)
*F15B 13/02* (2006.01)
(Continued)

(52) U.S. Cl.
CPC .............. *A01D 80/00* (2013.01); *F15B 13/02* (2013.01); *F15B 15/1428* (2013.01); *F15B 15/1447* (2013.01); *A01D 78/04* (2013.01)

(58) Field of Classification Search
CPC ........ A01D 80/00; A01D 78/04; A01D 84/00; A01D 89/008; F15B 13/02; F15B 15/1428; F15B 15/1447
See application file for complete search history.

(56) References Cited

U.S. PATENT DOCUMENTS

| | | | | | |
|---|---|---|---|---|---|
| 1,819,432 | A * | 8/1931 | Mickle | A01D 61/00 56/364 |
| 4,015,410 | A * | 4/1977 | Smith | A01D 84/00 56/364 |

(Continued)

FOREIGN PATENT DOCUMENTS

| | | | |
|---|---|---|---|
| DE | 202018107018 U1 * | 1/2019 | A01D 84/00 |
| EP | 2745672 | 6/2014 | |

(Continued)

OTHER PUBLICATIONS

Search Report dated Jun. 22, 2023 in priority Italian Application No. IT202200024819.

*Primary Examiner* — Arpad Fabian-Kovacs
(74) *Attorney, Agent, or Firm* — Wentsler LLC

(57) ABSTRACT

A windrow merger for collecting agricultural products from a field comprises a frame; a pick-up device; a conveyor; a guiding device; a support structure, equipped with arms connected to the guiding device and articulated to the frame to rotate relative to the frame about an axis of oscillation, comprising a rod rotating relative to the frame about an axis of rotation parallel to the axis of oscillation and connected to the arms by bars, in such a way that a rotation of the rod about the axis of rotation is linked to a rotation of the support structure about the axis of oscillation. An actuator is connected to the frame and to the rod, so that a position of the actuator is kinetically linked to the angular position of the rod about the axis of rotation for managing the position of the guiding device.

18 Claims, 11 Drawing Sheets

(51) Int. Cl.
*F15B 15/14* (2006.01)
*A01D 78/04* (2006.01)

(56) References Cited

U.S. PATENT DOCUMENTS

| | | | | | |
|---|---|---|---|---|---|
| 4,495,756 | A * | 1/1985 | Greiner | A01D 89/002 56/364 |
| 4,910,951 | A * | 3/1990 | Reilly | A01D 57/20 56/376 |
| 7,823,371 | B2 | 11/2010 | Gantzer et al. | |
| 9,192,102 | B2 * | 11/2015 | Gantzer | A01D 89/008 |
| 9,521,807 | B2 * | 12/2016 | Ubaldi | A01D 89/008 |
| 9,538,709 | B2 * | 1/2017 | Bassett | A01D 89/002 |
| 10,028,438 | B2 * | 7/2018 | Boone | A01D 89/007 |
| 12,063,892 | B2 * | 8/2024 | Babler | A01D 89/001 |
| 2001/0045087 | A1 * | 11/2001 | Franet | A01D 57/20 56/192 |
| 2009/0282800 | A1 * | 11/2009 | Gantzer | A01D 84/00 56/364 |
| 2014/0174051 | A1 | 6/2014 | Gantzer | |
| 2014/0196429 | A1 * | 7/2014 | Gantzer | A01D 84/00 56/377 |
| 2017/0303471 | A1 * | 10/2017 | Williams | A01D 89/003 |
| 2022/0000032 | A1 * | 1/2022 | Billard | A01D 43/10 |
| 2023/0363312 | A1 * | 11/2023 | Haga | A01D 89/008 |
| 2024/0147911 | A1 * | 5/2024 | Afting | A01D 84/00 |

FOREIGN PATENT DOCUMENTS

| | | | | |
|---|---|---|---|---|
| EP | 3135099 | A1 * | 3/2017 | A01D 89/002 |
| EP | 4442105 | A1 * | 10/2024 | A01D 89/004 |
| EP | 4684630 | A1 * | 1/2026 | A01D 57/12 |
| FR | 2898243 | | 9/2007 | |

* cited by examiner

WINDROW MERGER AND METHOD FOR FORMING WINDROWS THROUGH A WINDROW MERGER WHICH COLLECTS AGRICULTURAL PRODUCTS FROM A FIELD

The present invention relates to a windrow merger and a method for forming windrows through a windrow merger which collects agricultural products from a field. A windrow merger is an agricultural machine which collects hay, grass or other agricultural products (derived, for example, from a previous cutting step) and groups them on the ground forming a windrow for drying. Windrow mergers can be self-propelled, with a motor, or pulled by a tractor. In general, the windrow mergers comprise a frame which supports at least one pick up device for picking up agricultural products from a field and at least one device for moving the products collected, the movement device being located in the proximity of the pick up device and moving said products transversely to the latter.

This machine allows to plants lying on the ground to be picked up and to move them sideways in order to place them in a windrow. It is then possible to collect these windrows, for example, by means of a press for bales or a shredder or a self-loading truck. In this context, patent document U.S. Pat. No. 7,823,371B2 describes an example of a windrow merger. The windrow merger according to document U.S. Pat. No. 7,823,371B2 also comprises a guiding device for the products picked up, which is positioned at least partly above and proximal to the pick up device. Moreover, the pick up device is supported by arms which extend behind above the movement device and the rear ends of which are articulated relative to the frame by means of substantially horizontal axes located, during the operation, above the rear portion of the movement device and about which the arms can rotate by a certain angle.

Further Examples of known windrow mergers are disclosed by patent documents EP2745672A1 and FR2898243A1.

Prior art windrow mergers have some disadvantages, however, and can be improved. In effect, there are various needs in this sector.

A requirement is the robustness of the windrow merger; in particular, there is the need to have a solid guiding device, which is not very subject to twisting or to inclining relative to the horizontal plane, during use. Another requirement is that of reducing the risk of having faults or breakages of the guiding device, also when the windrow merger moves quickly on the field and taking into account that the ground on which the windrow merger moves could be uneven. Another need is that the windrow merger is practical to close when it needs to be transported on the road.

The aim of this invention is to provide a windrow merger and a method for forming windrows which overcome the above-mentioned drawbacks of the prior art.

Said aims are fully achieved by the windrow merger and by the method according to the invention, as characterised in the appended claims.

According to an aspect of the invention, the invention provides a windrow merger. The windrow merger is configured for collecting agricultural products from a field. The windrow merger picks up the agricultural products moving in an advancing direction. According to an example, the windrow merger is connectable to a tractor to be moved in the advancing direction. According to another example, the windrow merger can be self-propelled.

The windrow merger comprises a frame. The frame has a crosspiece. The crosspiece is oriented transversely to the advancing direction. The frame may also have a first and a second upright. According to an example, the first and the second upright are fixed to the crosspiece. The first and the second upright are fixed to the crosspiece to protrude upwards.

The windrow merger comprises a pick up device. The pick up device is configured for collecting the agricultural products.

The windrow merger includes a conveyor. The conveyor is connected to the frame. The conveyor is configured to receive the agricultural products from the pick up device. The conveyor is configured for moving the agricultural products in a conveying direction. The conveying direction is oriented horizontally. The conveying direction is transversal to the advancing direction.

The windrow merger includes a guiding device. According to an example, the guiding device is positioned upstream of the pick up device relative to the advancing direction. The windrower is configured for guiding the agricultural products towards the conveyor. The guiding device is movable between a lowered position and a raised position. According to an example, in the lowered position, the guiding device is proximal to the pick up device. According to an example, in the raised position, the guiding device is distal from the pick up device. According to an example, the guiding device acts in conjunction with the pick up device for moving the agricultural products towards the conveyor.

The windrow merger includes a support structure. The support structure is configured to support the guiding device. The support structure is configured to support the guiding device in a movable fashion. According to an example, the support structure includes a first arm and a second arm. Each of the first and second arms has a first end and a second end. According to an example, the first end is connected to the guiding device. According to an example, the second end is articulated to the frame. The second end is articulated to the frame in such a way that the support structure rotates relative to the frame. The support structure rotates about an axis of oscillation. The axis of oscillation is parallel to the conveying direction. The windrow merger includes an actuating structure. The actuating structure includes a rod. The rod extends parallel to the conveying direction. The rod extends between a first end and a second end. The rod is connected to the first and second upright. The rod is connected rotatably to the first and to the second upright. The rod is connected rotatably to the first and to the second upright at the first and second ends, respectively. The rod is configured to rotate along an axis of rotation. The axis of rotation is parallel to the axis of oscillation. According to an example, the axis of rotation is positioned at a height greater than the axis of oscillation. According to another example, the axis of rotation may be located at the same height as the axis of oscillation.

According to an example, the actuating structure includes a first and a second bar. The first and second bars are connected to the first and second arms, respectively. Each of said first and second bars is connected to the respective arm at an actuating point. According to an example, the actuation point is located between the first end and the second end of the arm. Each of said first and second bars is connected to the rod. Each of said first and second bars is connected to the rod, so that a rotation of the rod about the axis of rotation is kinematically linked to a rotation of the support structure about the axis of oscillation, by means of the first and the second bar. It should be noted that the bar may be any connecting element. The bar may be a rigid element, or it might be a tie rod, such as, for example, a rope or a cable.

The actuating structure may also include an actuator. The actuator is connected to the frame. The actuator is connected to the rod. The actuator is connected to the rod so that a position of the actuator is kinematically linked to the angular position of the rod about the axis of rotation.

For this reason, according to an aspect of this invention, the rod is connected to the support structure by means of the bars and, therefore, a rotation of the support structure about the axis of oscillation leads to a rotation of the rod about the axis of rotation, and vice versa; moreover, the actuator is connected to the rod, therefore, every movement of the guiding device and, consequently, the rotation of the support structure about the axis of oscillation, leads to a change in the position of the actuator and vice versa. This solution makes it possible to obtain a windrow merger wherein the arms of the support structure and the guiding device move in a particularly precise and stable manner, so it is possible to prevent oscillations and increase the robustness of the structure.

According to an example, the actuating structure comprises a first linking element and a second linking element. The first linking element and the second linking element include a first portion and a second portion.

According to an example, the first portion is fixed to the rod. According to an example, the second portion is articulated, respectively, to the first and to the second bar. The second portion is radially spaced from the axis of rotation.

For this reason, according to an aspect of this invention, each rotation of the rod about the axis of rotation leads to the rotation of the support structure about the axis of oscillation, by means of the bars which are connected to the rod by means of the linking elements. In other words, each movement of the rod about the axis of rotation is transferred to the bars and therefore to the arms by means of the linking elements and each movement of the arms is transferred to the rod by means of the linking elements. According to an example, the first linking element also comprises a third portion. The third portion is articulated to the actuator. The third portion is radially spaced from the axis of rotation.

For this reason, the position of the actuator is kinematically linked to the angular position of the rod about the axis of rotation by means of the third portion of the linking element.

According to an example embodiment, the third portion is angularly spaced from the second portion. The third portion is angularly spaced from the second portion by a predetermined angle. The predetermined angle is greater than zero. For this reason, the connection point of the actuator to the rod is different from the second portion of the linking element. This solution makes it possible to obtain an actuating structure with greater efficiency. In effect, this configuration makes it possible to have a favourable point on the linking element, between the second and the third portion, during the rotation of the rod and of the support structure. According to an example, the actuator comprises a single piston-cylinder system. According to an example, the piston-cylinder system is located at the first end of the rod. In particular, the piston-cylinder system is connected to the rod at the third portion of the linking element. For this reason, according to an aspect of this invention, only one end of the rod is connected to the actuator; moreover, the first and the second arm of the support structure are connected to each other by the rod, so, in this configuration, a change of position of the actuator leads to a rotation of the rod about the axis of rotation; this rotary movement of the rod causes a rotation of the first arm about the axis of oscillation, by means of the first bar; moreover, at the same time, the second arm is oscillated about the axis of oscillation, because the movement of the first arm is transmitted to the second arm by the rod. Moreover, by positioning the actuator only on one end of the rod it is possible to provide more space on the windrow merger; this is a useful for example when the windrow merger must be closed for being transported. According to an example the actuator is a hydraulic system. The hydraulic system comprises a cylinder. The cylinder is oriented in a longitudinal direction.

The hydraulic system also comprises a piston. The piston is positioned inside the cylinder. The piston defines inside the cylinder a first chamber and a second chamber. The first and the second chamber are filled with oil under pressure. The first and the second chamber are in fluid communication. The first and the second chamber are in fluid communication in such a way that the oil can move between the first and the second chamber. In particular, the oil moves between the first and the second chamber in response to a movement of the piston inside the cylinder.

The hydraulic system comprises a rod. The rod is movable in the cylinder for kinematically linking said position of the actuator to the angular position of the rod about the axis of rotation. The rod is connected to the piston. According to an example, the rod has a first portion and a second position. According to an example, the first portion of the rod is positioned partly in the first chamber and partly outside the cylinder. According to an example, the second portion of the rod is positioned partly in the second chamber. The hydraulic system also comprises an accumulator. The accumulator is in fluid communication with the oil contained in the first and in the second chamber. The first portion of the rod has a first diameter, and the second portion of the rod has a second diameter. According to an example, the second diameter is greater than the first diameter. For this reason, a force is generated at the piston which pushes the rod to move backwards, in the absence of other forces. This configuration allows the arms to be lifted more efficiently and prevents the guiding device from falling downwards due to the force of gravity. According to an example, the actuator comprises a connection conduit. The connection conduit allows the passage of oil between the first and the second chamber of the cylinder.

According to an example, the actuator includes a throttling valve. The throttling valve is positioned in the connection conduit.

The actuator may comprise a lifting valve. The lifting valve constitutes a passive unidirectional valve. The passive unidirectional valve is positioned in the connection conduit. The passive unidirectional valve is positioned in parallel with the throttling valve. According to an example, the oil can pass from the second chamber to the first chamber through the unidirectional valve. Moreover, according to an example, the oil is forced to pass through the throttling valve to pass from the first to the second chamber.

For this reason, according to an aspect of this invention, when the support structure rotates about the axis of oscillation forwards and consequently the guiding device moves towards the lowered position, the rod and the piston move inside the cylinder, upwards, and therefore the rod is extended and at least a part of the oil is transferred from the first chamber to the second chamber. As explained above, the oil, when moving from the first chamber to the second chamber, passes firstly from the throttling valve; this solution guarantees a damping effect every time the guiding device is lowered. For this reason, it is possible to increase the robustness of the windrow merger.

According to an example, the actuator comprises a lowering valve. The lowering valve is positioned in the connection conduit. The lowering valve is configured to be moved between an open configuration and a blocking configuration. According to an example, in the open configuration, the oil can flow freely through the lowering valve. According to an example, in the blocking configuration, the lowering valve constitutes a unidirectional valve in such a way that the oil can only pass from the first chamber to the second chamber. For this reason, it is possible to prevent the guiding device from lifting towards the raised position, in the blocking configuration; while in the open configuration, the oil can move between the first and the second chamber and the guiding device can be moved downwards and upwards in two directions, as explained above.

According to an example, the actuator comprises a front volume. The front volume is defined inside the cylinder. The front volume includes the first and the second chamber. The actuator may comprise an inner flange. The inner flange is provided by the cylinder. The inner flange is positioned inside the cylinder.

According to an example, the actuator comprises a rear volume. The rear volume is defined inside the cylinder. According to an example, the rear volume is separated from the front volume by the inner flange.

According to an example, the actuator includes a slidable annular wall. The sliding annular wall is movable longitudinally in the rear volume. The sliding annular wall is with the inner flange to define a third chamber. The third chamber allows further oil in communication with an oil pressure source. The actuator includes a locking valve. The locking valve is configured for managing the flow of the further oil in and out of the third chamber. The locking valve is configured to be moved between a forward configuration, a backward configuration and a neutral configuration. In the forward configuration, the volume of the third chamber is reduced. Moreover, in the forward configuration the slidable annular wall moves towards the inner flange.

In the backward configuration, the volume of the third chamber is expanded. Moreover, in the backward configuration the slidable annular wall moves away from the inner flange.

In the neutral configuration, the position of the sliding annular wall is fixed. The second portion of the rod has a front end and a rear end. According to an example, the front end of the second portion of the rod is connected to the piston. According to an example, the rear end of the second portion of the rod is positioned in the rear volume. Moreover, the slidable annular wall constitutes a stop element for the rear end of the second portion of the rod. The stop element (that is, the contact element) limits a forward movement of the rod.

This solution prevents the guiding device from moving downwards and fixing it at a predetermined height. This predetermined height is adjustable by moving the annular wall inside the rear volume, inserting oil inside the third chamber or removing oil from the third chamber.

According to an aspect of the invention, this invention provides a method for forming windrows through a windrow merger which picks up agricultural products from a field. The method comprises a step of moving the windrow merger in an advancing direction.

The method comprises a step for collecting agricultural products using a pick up device of the windrow merger.

The method comprises a step of moving agricultural products picked up, by means of a conveyor. The agricultural products picked up are moved by the conveyor, in a conveying direction. The conveying direction is oriented horizontally. The conveying direction is oriented transversely to the advancing direction.

The method comprises a step of preparing a guiding device. The guiding device is located upstream of the pick up device relative to the advancing direction. The guiding device is configured for guiding the agricultural products towards the conveyor. The guiding device is movable between a lowered position and a raised position. In the lowered position, the guiding device is proximal to the pick up device. In the raised position, the guiding device is distal from the pick up device.

The method comprises a step of supporting, in a movable fashion, the guiding device using a support structure. The support structure is articulated to a frame of the windrow merger, to rotate about an axis of oscillation. The axis of oscillation is parallel to the conveying direction.

The method comprises a step of preparing an actuating structure. The actuating structure comprises a rod. The rod extends parallel to the conveying direction. The rod is rotatably connected to the frame to rotate about an axis of rotation. The axis of rotation is parallel to the axis of oscillation. According to an example, the axis of rotation is positioned at a height greater than the axis of oscillation. According to another example, the axis of rotation may be located at the same height as the axis of oscillation.

The actuating structure includes levers. The bars connect the support structure to the rod.

The actuating structure includes an actuator. The actuator is connected to the frame. The actuator is connected to the rod.

According to an example, the movements of the guiding device between the lowered position and the raised position, by rotation of the support structure around the pivoting axis, are kinematically linked to a position of the actuator through the rotation of the rod around the rotation axis.

According to an example, the bars are articulated to linking elements. The connection elements are fixed at opposite ends of the rod. According to an example, the actuator includes a single piston-cylinder system. According to an example, the single piston-cylinder system is located at one of said ends of the rod.

According to an example, the actuator is a hydraulic system. The hydraulic system comprises a cylinder. The cylinder is tubular. The cylinder is oriented in a longitudinal direction.

The hydraulic system includes a piston. The piston defines inside the cylinder a first chamber and a second chamber. Pressurised oil moves between the first and the second chamber when the piston moves inside the cylinder.

The hydraulic system includes a rod. The rod has a first portion. The first portion is positioned partly in the first chamber and partly outside the cylinder. The rod has a second portion. The second portion is positioned at least partly in the second chamber. The first portion of the rod has a first diameter. The second portion of the rod has a second diameter. According to an example, the second diameter is greater than the first diameter, in such a way as to generate a force on the piston which pushes the rod to move backwards, in the absence of other forces.

The rod is connected to the piston.

When the guiding device moves towards the lowered position, the rod is extracted from the cylinder and oil is transferred from the first chamber to the second chamber.

When the guiding device moves towards the raised position, the rod retracts into the cylinder and oil is transferred from the second chamber to the first chamber.

According to an example, the second chamber is in fluid communication with an accumulator. According to an example, the actuator comprises a connection conduit. The oil between the first and the second chamber of the cylinder passes through said connection conduit.

According to an example, the actuator includes a throttling valve. The throttling valve is positioned in the connection conduit. According to an example, the oil is forced to pass through the throttling valve when the guiding device is lowered and the oil moves from the first chamber to the second chamber.

According to an example, the actuator includes a lifting valve. According to an example, the oil passes through the lifting valve when the guiding device rises and the oil moves from the second chamber to the first chamber. Therefore, the lifting valve allows the passage of the oil only from the second chamber to the first chamber.

According to an example, the actuator comprises a lowering valve. The lowering valve is positioned in the connection conduit. The lowering valve has two operating configurations. Said two operating configurations include an open configuration and a blocking configuration.

According to an example, when the lowering valve is in the open configuration, the oil is free to flow through it between the first and the second chamber. Moreover, when the lowering valve is in the blocking configuration, the oil can pass through it only from the first chamber to the second chamber but not vice versa.

According to an example, the actuator comprises a front volume. The front volume is defined inside the cylinder. The front volume forms the first and the second chamber. The actuator may also include a rear volume. The rear volume is defined inside the cylinder. The rear volume is separated from the front volume by an inner flange.

The actuator includes a slidable annular wall. The sliding annular wall acts in conjunction with the inner flange to form, inside the rear volume, a third chamber. The sliding annular wall moves inside the rear volume in response to an entrance and exit of further oil to and from the rear volume. When the further oil enters the third chamber, the annular wall is pushed away from the inner flange. When the further oil leaves the third chamber, the annular wall moves towards the inner flange.

A front end of the second portion of the rod is connected to the piston. A rear end of the second portion of the rod is positioned in the rear volume. The sliding annular wall constitutes a contact element. The contact element limits a movement of extraction of the rod. It should be noted that the windrow merger can comprise one or more windrow merger modules according to this description.

This and other features will become more apparent from the following description of a preferred embodiment of the invention, illustrated by way of non-limiting example in the accompanying tables of drawings, in which.

Figure 1:
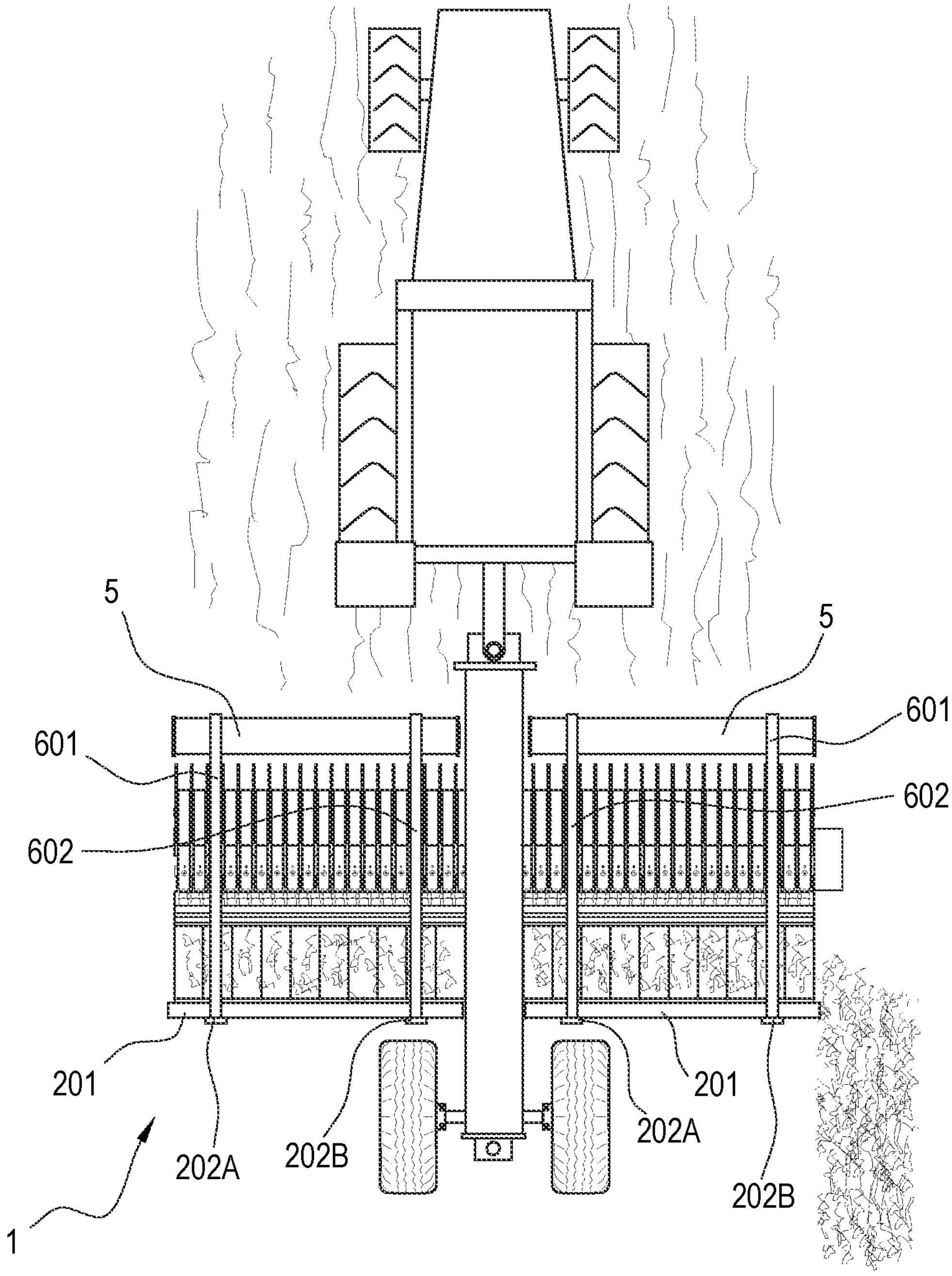
FIG. 1 is a plan view of a windrow merger, including two windrow merger modules according to the invention, connected to a tractor.
Figure 2:
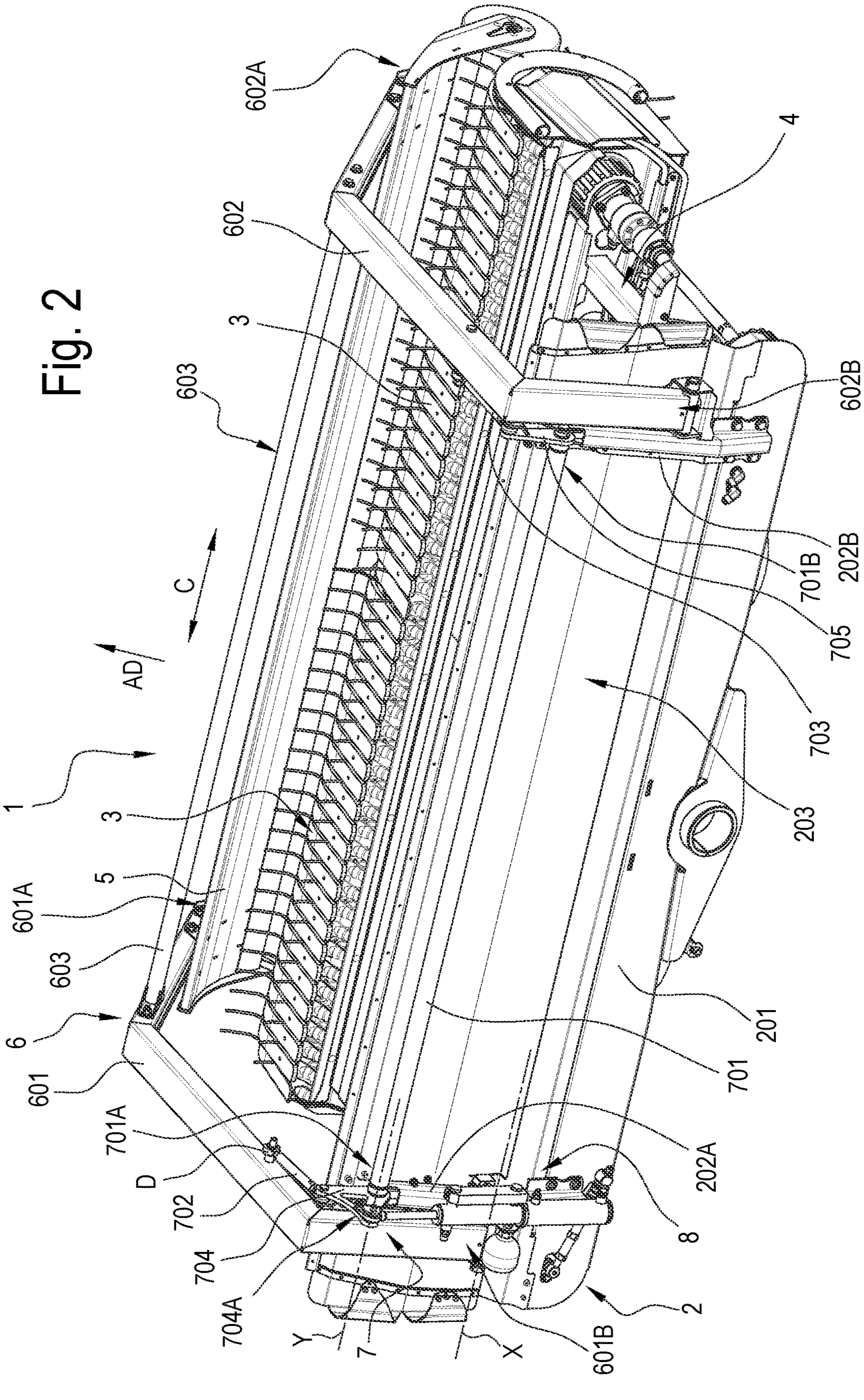
FIGS. 2 and 3 illustrate a windrow merger module according to this invention according to a different angle, with the guiding device in the lowered and raised position.
Figure 3:
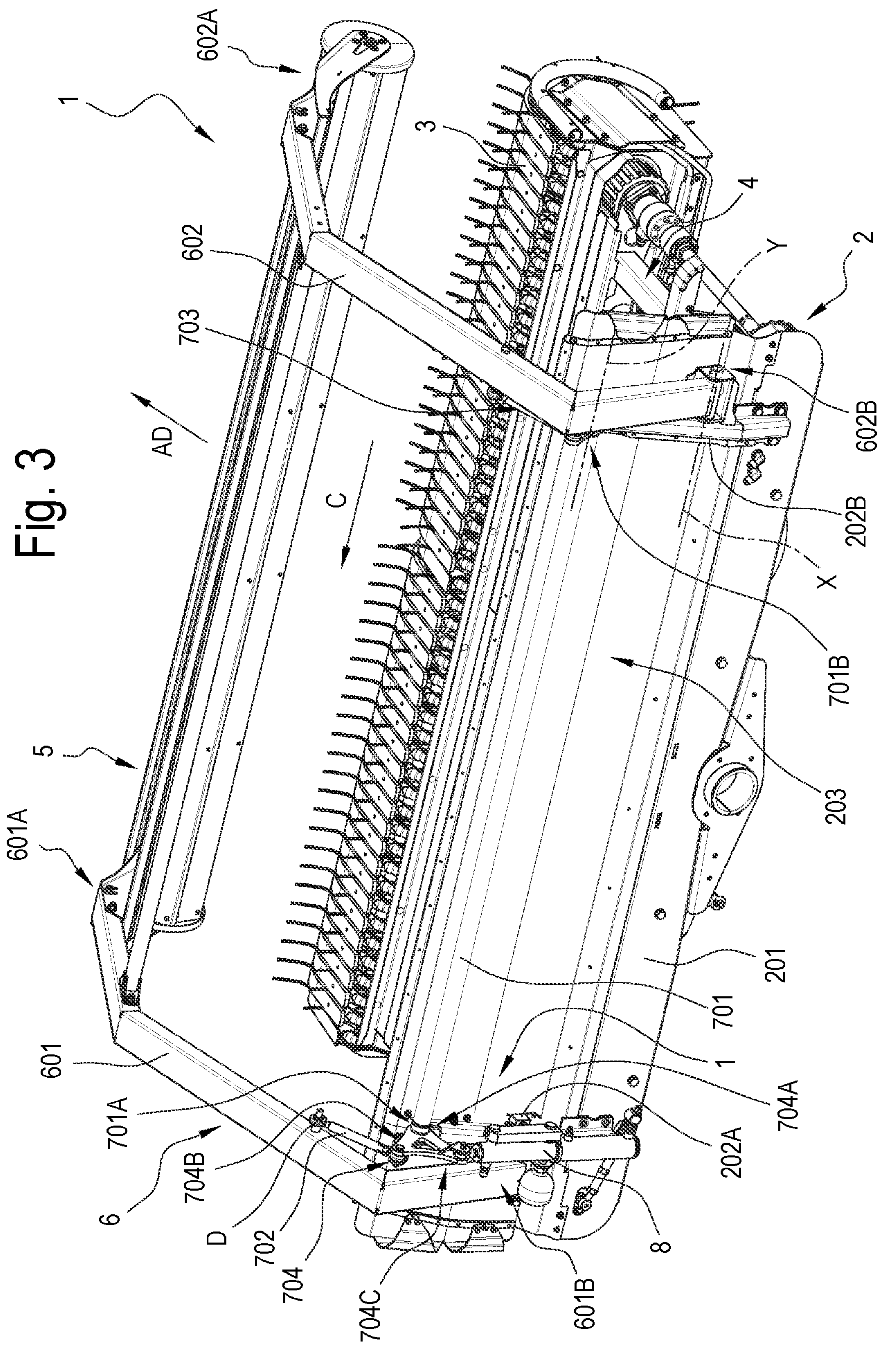
Figure 4:
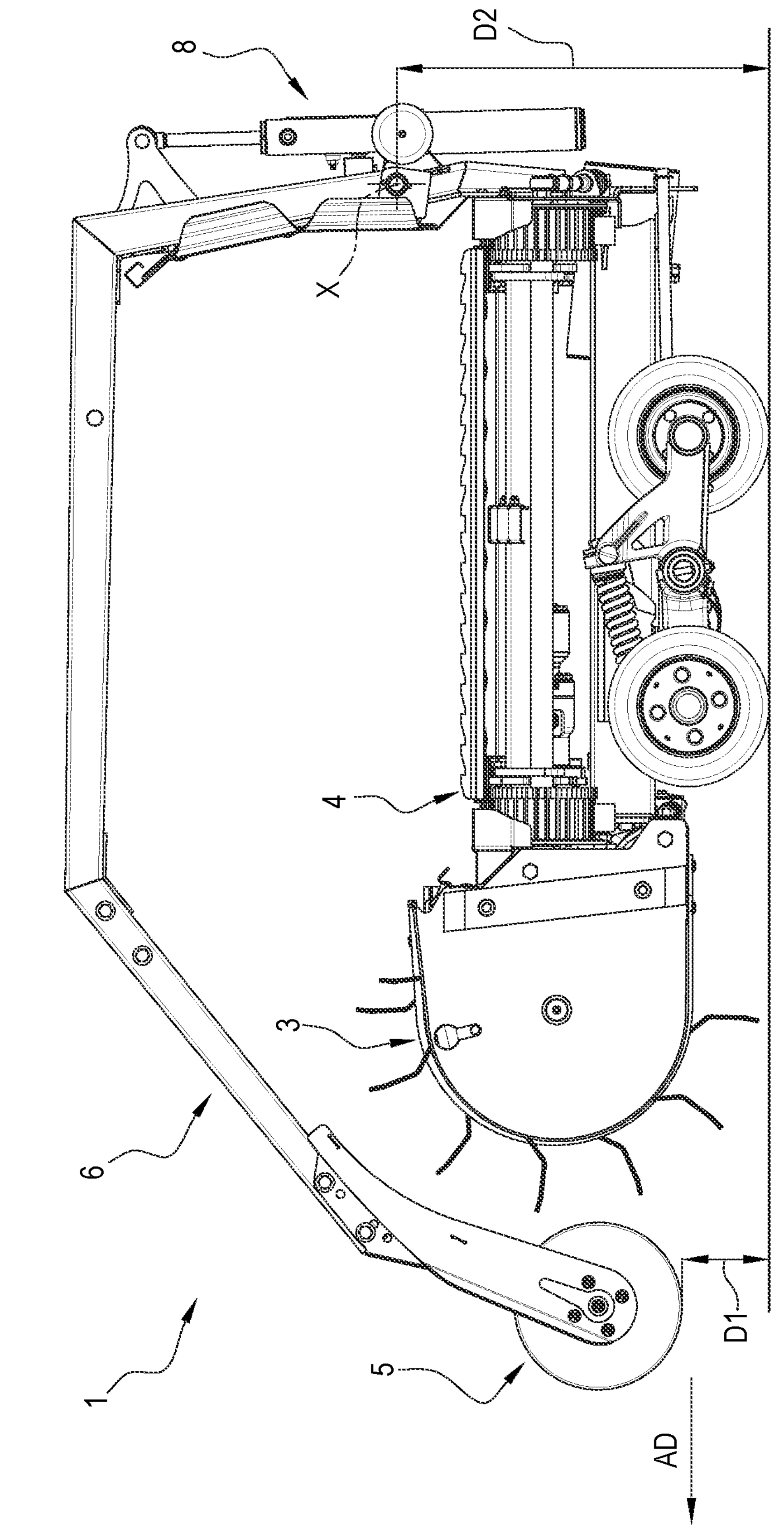
FIG. 4 is a side view of the windrow merger with the guiding device in the lowered position.
Figure 5:
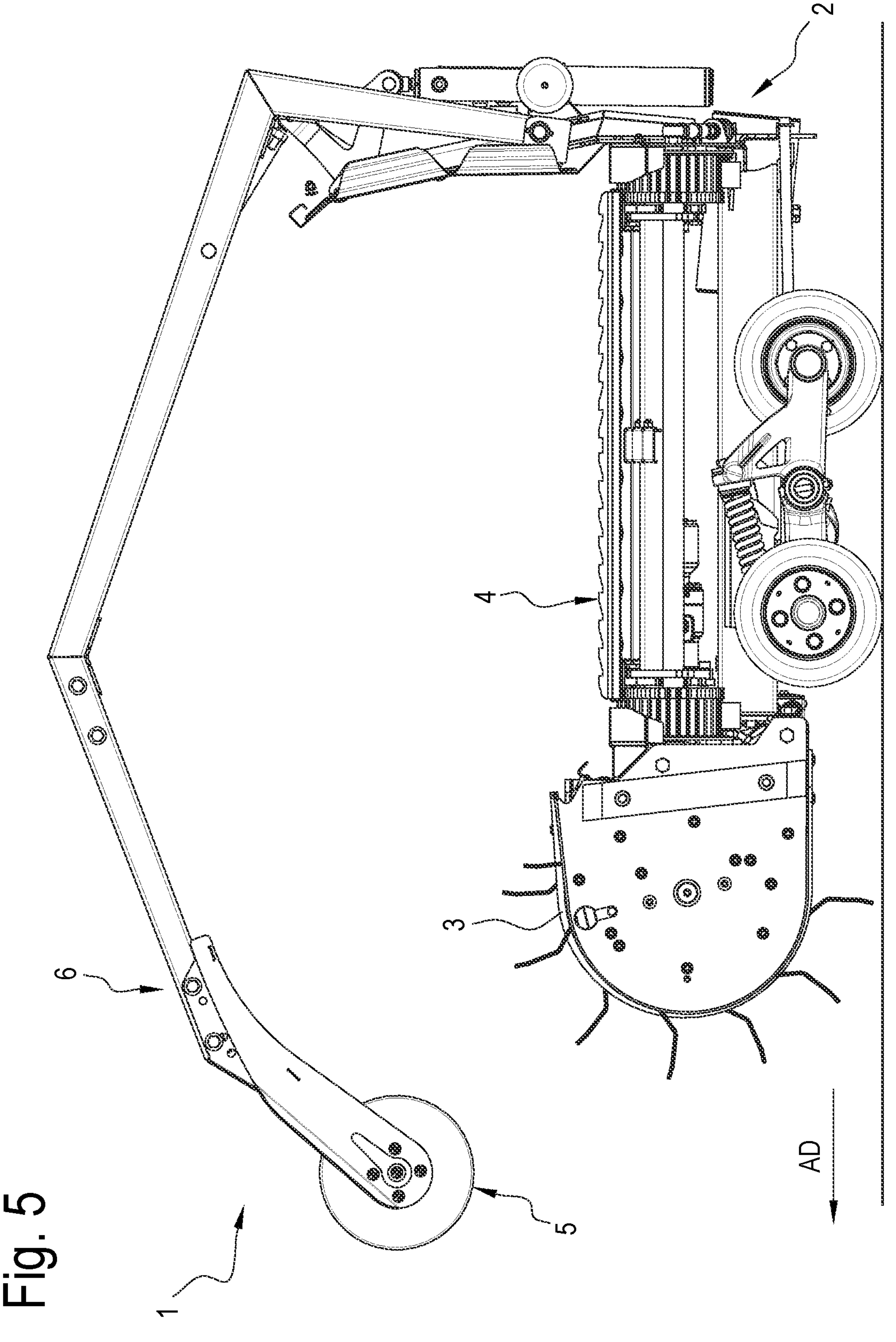
FIG. 5 is a side view of the windrow merger with the guiding device in the raised position.
Figure 6A:
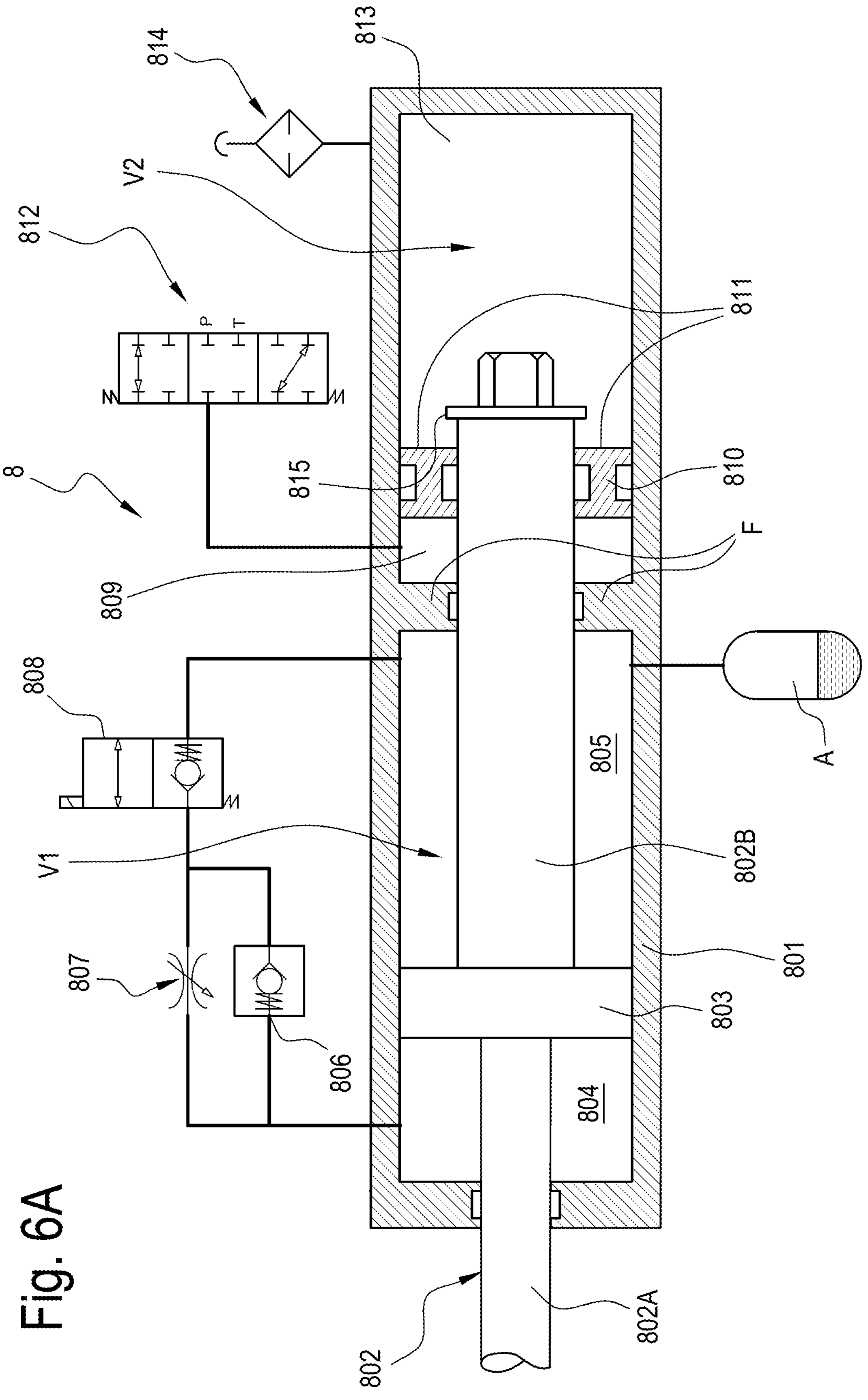
FIG. 6A illustrates the hydraulic system with the rod in the forward configuration.
Figure 6B:
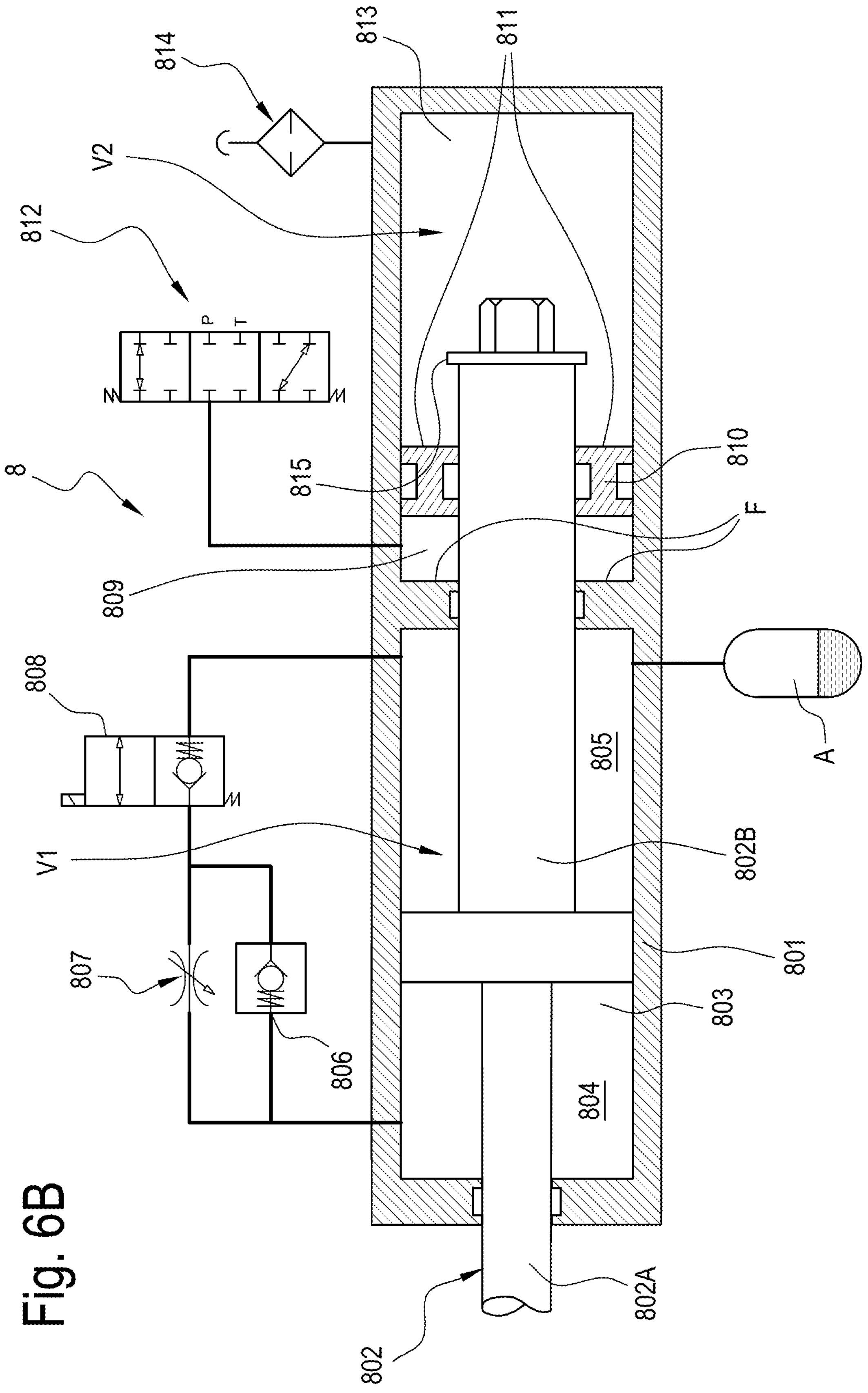
FIG. 6B illustrates the hydraulic system with the rod in the backward configuration.
Figure 7:
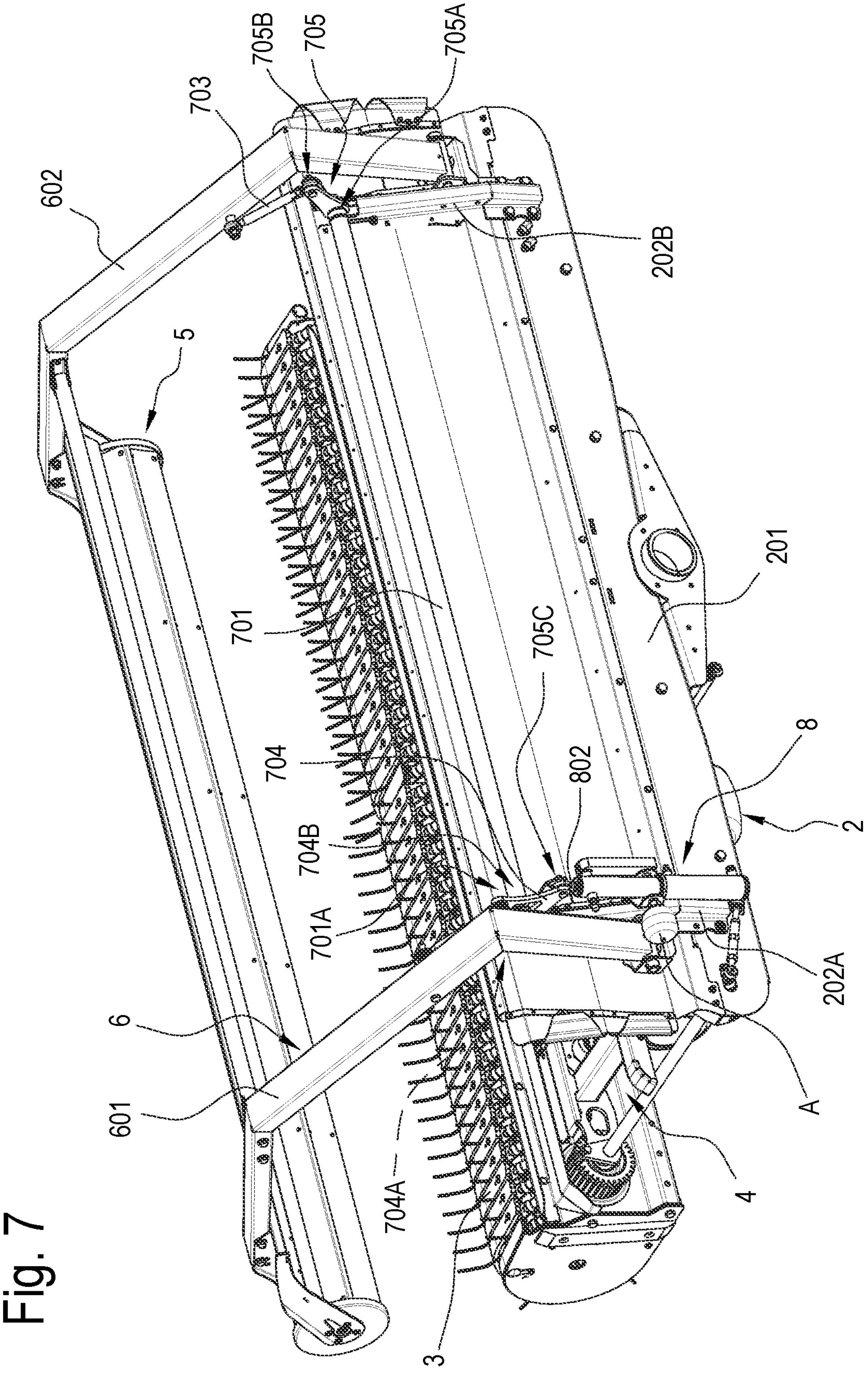
FIG. 7 illustrates the rear part of a windrow merger module.
Figure 8:
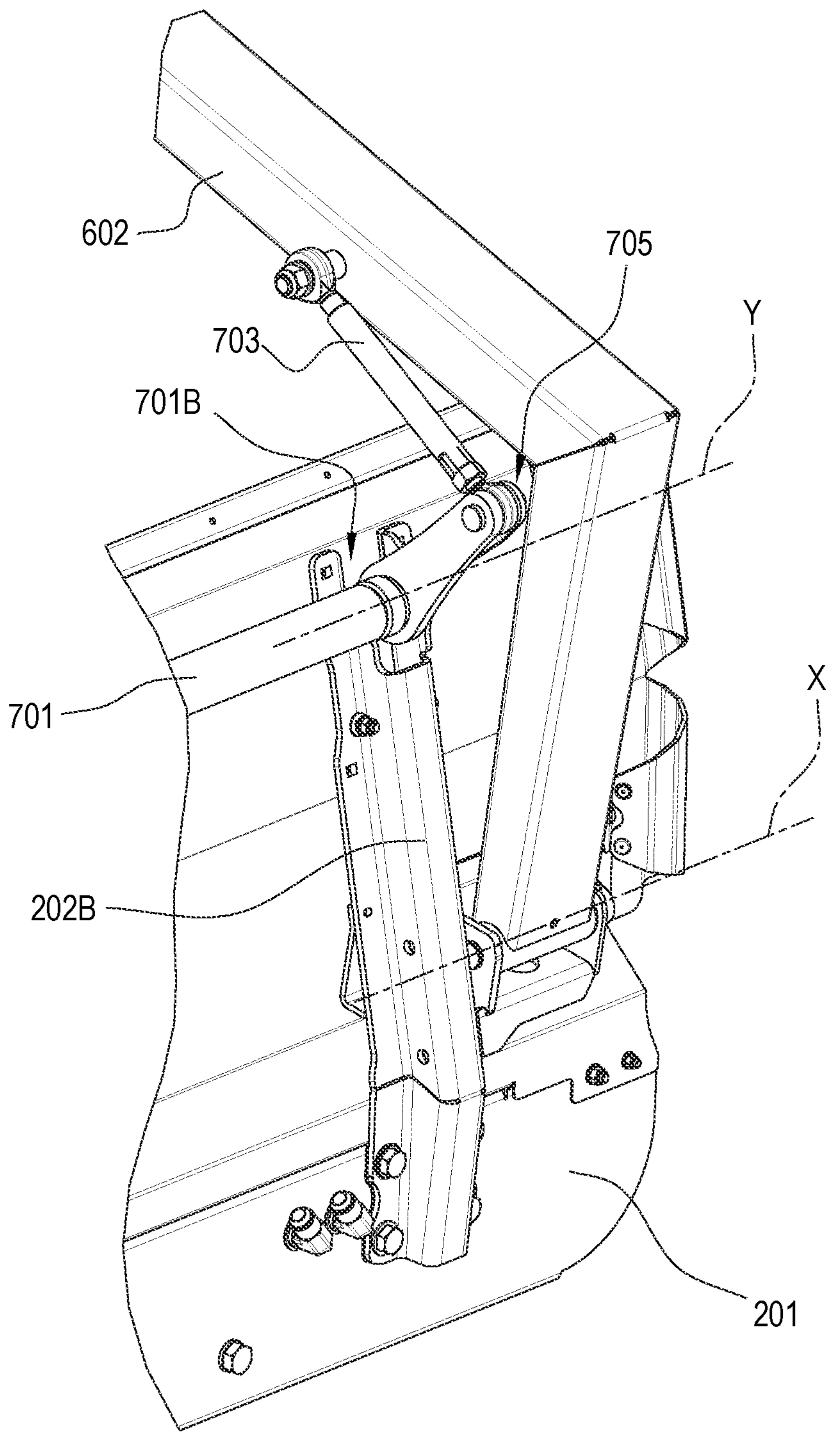
FIGS. 8 and 9 illustrate further details of the first and second linking elements.
Figure 9:
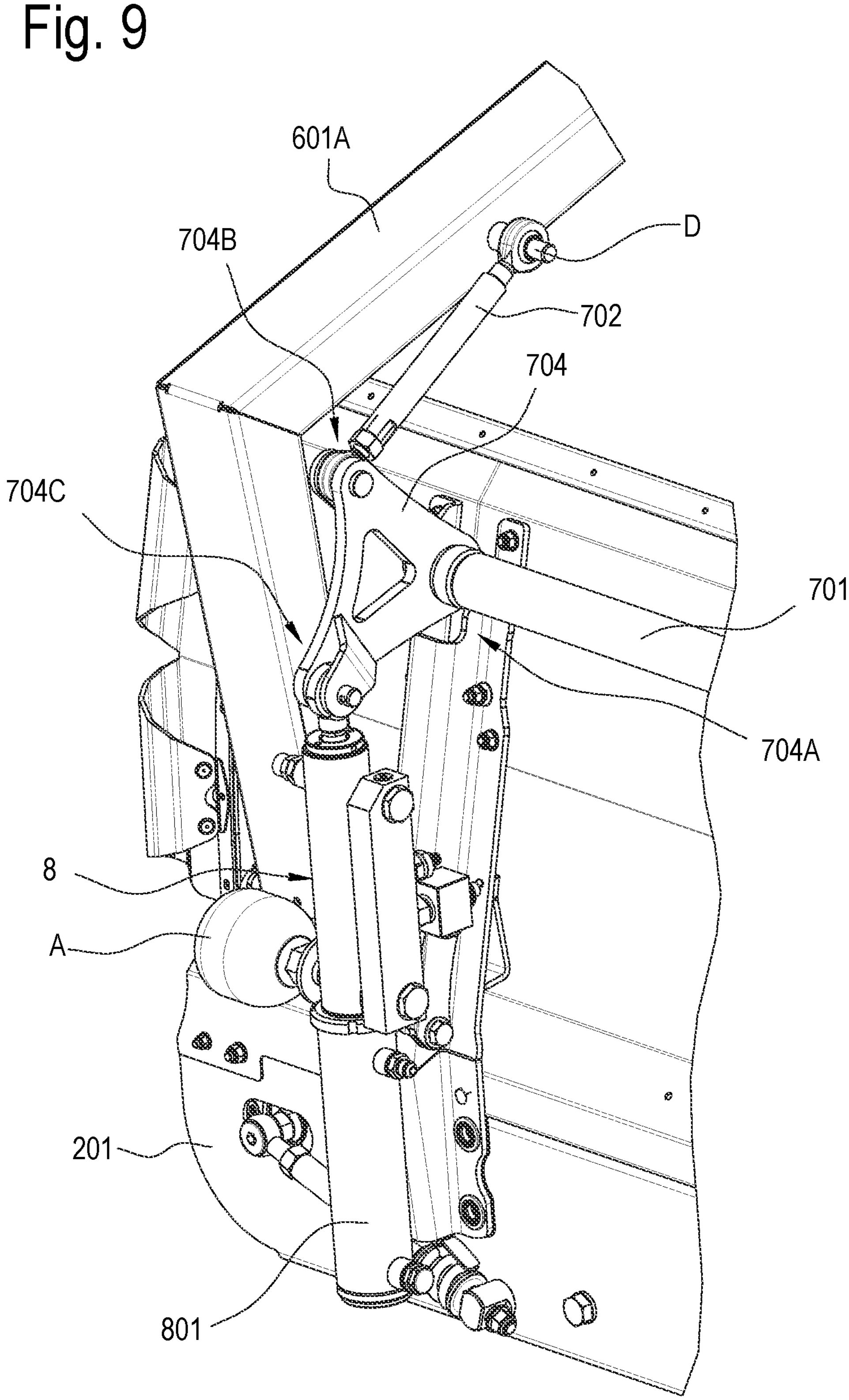
Figure 10:
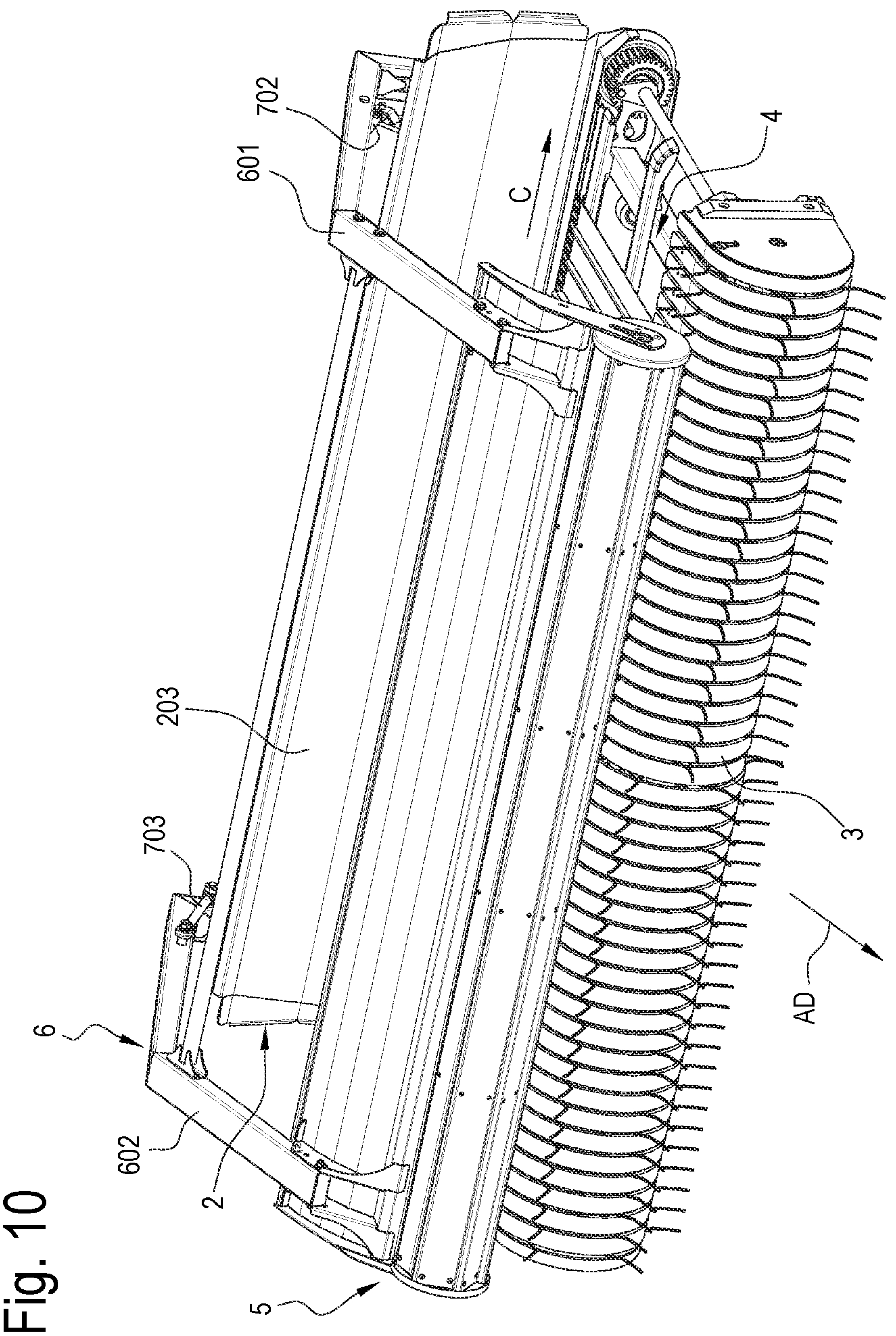
FIG. 10 illustrates the front part of a windrow merger module.

With reference to the accompanying drawings, the numeral 1 denotes a windrow merger. The windrow merger 1 is configured for collecting agricultural products from a field. The windrow merger 1 moves in an advancing direction AD. The windrow merger can include wheels. According to an example, the windrow merger 1 is pulled by another agricultural machine, for example a tractor, along the advancing direction AD. According to another example, the windrow merger 1 may be self-propelled to move along the advancing direction. The windrow merger includes a frame 2. The frame may comprise a crosspiece 201. The crosspiece 201 is oriented transversally to the advancing direction AD. The frame 2 may also comprise a first upright 202A and a second upright 202B. The first and the second upright are fixed to the crosspiece 201. The uprights protrude from the crosspiece 201 upwards.

The windrow merger 1 also includes a pick up device 3. The pick up device 3 picks up the agricultural products. The pick up device 3 may be a roller which rotates about an axis, in a direction opposite to the direction of rotation of the wheels of the windrow merger when it advances along said advancing direction. The windrow merger 1 also includes a conveyor 4. The conveyor 4 is connected to the frame 2. The conveyor receives the agricultural products from the pick up device and moves them in a conveying direction C. The conveying direction C is oriented horizontally and transversely to the advancing direction AD. The conveyor may be a conveyor belt.

The windrow merger 1 includes a guiding device 5. The guiding device is positioned upstream of the pick up device 3 relative to the advancing direction AD. In particular, the guiding device 5 guides the agricultural products towards the conveyor 4. The guiding device 5 is movable between a lowered position, proximal to the pick up device 3 and a raised position, distal from the pick up device 3. According to an example, the guiding device 5 is made of aluminium. According to an example, the guiding device 5 is in the form of a roller. According to an example, the windrow merger 1 includes a support structure 6, which supports the guiding device 5 in a movable fashion. The support structure comprises a first arm 601 and a second arm 601. Each arm has a first end 601A, 602A connected to the guiding device 5 and a second end articulated to the frame 2. In particular, the second end of each arm is articulated to a respective upright between the first and the second upright 202A, 202B. For this reason, the support structure rotates relative to the frame 2 about an axis of oscillation X. The axis of oscillation X is parallel to the conveying direction C. The axis of oscillation X is located upstream of the guiding device relative to the advancing direction AD. The axis of oscillation is located at a height above the ground. According to an example, the axis of oscillation X is positioned at a height greater than a lower end of the guiding device 5 in the lowered position. According to an example, the height of the axis of oscillation X relative to the ground D2 is between 700 and 800 mm. Preferably, the height of the axis of oscillation X relative to the ground is equal to 650 mm. The height of the lowest end of the guiding device in the lowered position D1 is between 160 and 240 mm. Preferably, the height of the lowest end of the guiding device in the lowered position D1 is equal to 200 mm.

According to an example, a ratio between the height of the axis of oscillation X relative to the ground D2 and the height of the lowest end of the guiding device in the lowered position D1 is less than or equal to 5. Preferably, the ratio between the height of the axis of oscillation X relative to the ground D2 and the height of the lowest end of the guiding device in the lowered position D1 is less than or equal to 4.

Moreover, according to an example, the frame 2 includes a support surface 203. The support surface extends from the crosspiece 201 upwards. According to an example, the uprights 202A, 202B are fixed to the crosspiece 201 at one end and to the support surface 203 at the other end.

The support surface supports the weight of the arms. The support surface is foldable downwards and upwards in response to the rotation of the support structure about the axis of oscillation X. According to an example, the support structure includes a connection bar 603. The first and the second arm are connected to each other by the connection bar.

The windrow merger also includes an actuating structure 7. The actuating structure comprises a rod 701. The rod 701 extends parallel to the conveying direction between a first end 701A and a second end 702A and is rotatably connected to the first and to the second upright 202A, 202B at the first and the second end 701A, 702A, respectively, for rotating along an axis of rotation Y. The axis of rotation Y is parallel to the axis of oscillation X. Preferably, the axis of rotation Y is positioned at a height greater than (or equal to) the axis of oscillation X. For this reason, the first and the second arm 601, 602 are connected to each other by the rod 701.

The actuating structure 7 includes a first and a second bar 702, 703. The bars are connected, respectively, to the first and to the second arm 601, 602. Each of said first and second bars is connected to the respective arm at an actuating point D, located between the first and the second end of the arm 601A, 602A, 601B, 602B. Moreover, each bar is connected to the rod 701. A rotation of the rod 701 about the axis of rotation Y is kinematically linked to a rotation of the support structure 6 about the axis of oscillation X, by means of the first and the second bar 702, 703. In other words, each rotation of the rod 701 about the axis of rotation Y leads to the rotation of the support structure 6 about the axis of oscillation X, and vice versa. The actuating structure includes an actuator 8. The actuator 8 is connected to the frame 2 and to the rod 701. A position of the actuator 8 is kinematically linked to an angular position of the rod about the axis of rotation Y. In other words, changing the position of the actuator 8 causes a rotation of the rod 701 about the axis of oscillation and vice versa.

According to an example, the actuator 8 is a hydraulic system. The hydraulic system comprises a cylinder 801, oriented in a longitudinal direction. The cylinder 801 is tubular.

The hydraulic system also comprises a piston 803, positioned inside the cylinder 801. The piston is movable inside the cylinder 801 and defines a first chamber 804 and a second chamber 805, inside the cylinder. The volume of each of the chambers 804, 805 changes in response to the movement of the piston inside the cylinder. The first and the second chamber are filled with oil under pressure. The first and second chamber are in fluid communication and the oil can move between the first and the second chamber in response to a movement of the piston inside the cylinder. Moreover, the hydraulic system includes an accumulator A. The accumulator A is in fluid communication with the oil in the first and in the second chamber. Preferably, the accumulator A is connected to the second chamber 805. For this reason, when the oil is transferred from the first chamber to the second chamber, a part of the oil is contained by the accumulator. The accumulator keeps the oil under pressure. The accumulator is configured to contain more or less oil depending on the pressure of the oil itself; for example, the accumulator forms a chamber for the oil separated from a chamber containing a pressurised gas, the chamber of the oil and the chamber of the gas being separated by a movable partition, which is positioned in such a way as to establish a equilibrium pressure between the oil and the gas. According to an example, the accumulator A is a membrane-type accumulator (the membrane may be replaced by a rigid sliding wall). In particular, a membrane is used in the membrane-type accumulator to divide the fluid side (where the oil in this case is accumulated) and the gas side of the accumulator. The hydraulic system (consisting of the first chamber, the second chamber and the accumulator) is a closed system.

The hydraulic system includes a rod 802, movable in the cylinder 801. The rod has a first portion 802A, positioned partly in the first chamber and partly outside the cylinder, and a second portion 802B positioned at least partly in the second chamber 805. According to an example, a diameter of the first portion 802 of the rod is less than the diameter of the second portion of the rod; for this reason, a force is generated on the piston which pushes the rod to move backwards, in the absence of other forces. In other words, the diameter of the first part of the rod which is partly inside the first chamber is greater than the diameter of the second portion of the rod which is partly inside the second chamber, so, in the first chamber 804 there is a force greater; the accumulator A, connected to the second chamber, guarantees the existence of the greater force inside. This difference helps to lighten the support structure and creates a pulling force which helps to lift the arms. The rod 801 is connected to the piston 803.

The rod 801 connects said position of the actuator to the angular position of the rod about the axis of rotation. In other words, when the guiding device moves towards the lowered position, the rod moves out of the cylinder 801 and at least a part of the oil is transferred from the first chamber to the second chamber, and, when the guiding device moves towards the raised position, the rod withdraws into the cylinder and at least a part of the oil is transferred from the second chamber to the first chamber.

In particular, the rod 801 moves with an extraction movement wherein the rod extends outside the cylinder 801 and the guiding device 5 moves towards the lowered position, and a retraction movement, wherein the rod 802 withdraws into the cylinder 801 and the guiding device is moved towards the raised position. The rod is configured to move along the tube of the cylinder for adjusting a height of the guiding device 5 relative to the ground between the lowered position and the raised position.

According to an example, the actuator 8 comprises a connection conduit which allows the passage of the oil between the first and the second chamber 804, 805 of the cylinder 801.

The actuator 8 includes a throttling valve 807 located in the connection conduit, and a lifting valve 806 which constitutes a passive unidirectional valve positioned in the connection conduit in parallel with the throttling valve 807. In particular, the oil can pass only from the second chamber to the first chamber through the unidirectional valve 806 and is forced to pass through the throttling valve 807 to pass from the first chamber to the second chamber.

The actuator 8 may also include a lowering valve 808. The lowering valve is a solenoid valve. The lowering valve is positioned in the connection conduit, and can have two different operating configurations. in an open configuration, the oil can flow freely through the lowering valve between the first and second chambers, and in a blocking configuration, the lowering valve constitutes a unidirectional valve through which the oil can pass only from the first chamber to the second chamber. For this reason, in the blocking configuration of the solenoid valve, the rod is blocked downwards and can no longer be raised.

According to an example, the actuator 8 comprises a front volume V1 and a rear volume. The inner volume is inside the cylinder 801, and forms the first and the second chamber 804, 805.

The rear volume V2 is inside the cylinder 801 and separated from the front volume V1 by an inner flange F. For this reason, oil of the front volume does not enter the volume of the rear volume.

The actuator includes a sliding annular wall 810. The annular wall is movable longitudinally in the rear volume V2. According to an example, the annular wall 810 acts in conjunction with the inner flange F to form a third chamber 809 inside the rear volume V2. The third chamber is connected to a source of oil pressure to receive additional oil. The rear volume V2 also includes a fourth chamber 813. The fourth chamber is separated from the third chamber by the annular wall 810. The fourth chamber is filled with air. The rear volume V2 includes a vent 814 (that is, a vent valve).

The actuator includes a locking valve 812 for managing the flow of the further oil in and out from the third chamber. The locking valve can have three different operating configurations.

In a forward configuration, the volume of the third chamber 809 is reduced and the sliding annular wall 810 approaches the inner flange F.

In a backward configuration, the volume of the third chamber 809 is expanded and the sliding annular wall moves away from the inner flange F. In a neutral configuration, the position of the sliding annular wall is fixed. In the backward configuration, the sliding annular wall moves away from the inner flange F and the volume of the fourth chamber 813 is reduced; in this configuration, the air exits the fourth chamber through said vent 814.

For this reason, the sliding annular wall moves within the rear volume in response to an entrance and exit of further oil to and from the rear volume, wherein as further oil enters the third chamber, the annular wall 810 is pushed away from the inner flange F, and as further oil exits the third chamber, the annular wall moves towards the inner flange.

The second portion 802B of the rod 802 has a front end which is connected to the piston 803 and a rear end positioned in the rear volume V2. The slidable annular wall constitutes a stop element 811 which limits the movement of extraction of the rod.

In particular, the sliding annular part forms the stop element 811 which blocks a protrusion 815 of the rear end of the rod and limits the extraction movement of the rod.

It should be noted that the actuator 8 may have a passive part and an active part. As explained above, according to an example, the oil can pass freely between the first and the second chamber; in this example, the front volume of the actuator allows the guiding device to move upwards and downwards between the lowered position and the raised position; it should be noted that in the downward movement the movement of the guiding device is dampened by means of the throttling valve. Moreover, a minimum height above ground is guaranteed for the guiding device by means of the contact element. Moreover, it is possible to adjust the minimum height completely lifting the arms, and consequently the guiding device, by moving the contact element, inserting further oil in the third chamber. For this reason, according to this example, the rear volume V2 is an active actuator. Moreover, it is possible to fix the guiding device in a predetermined position, using the lowering valve in the blocking configuration to prevent the guiding device from lifting and by means of the contact element to prevent the forward movement (extraction movement) of the rod and consequently the forward movement (downwards) of the guiding device.

For this reason, the actuating structure 7 may operate in conjunction with the support structure 6 for supporting the guiding device in a relative operating position and for allowing it to have movement upwards and downwards and to move it upwards. During the operation of the windrow merger, the rod 801 slides forwards and backwards with respect to the sliding annular wall 810 which remains in a fixed position inside the rear volume V2. For this reason, during the operation, the guiding device can move upwards and downwards and the damping during the downward movement is guaranteed by the throttling valve, whilst the minimum height of the guiding device in the lowered position D1 is determined by the position of the contact element which remains fixed inside the rear volume during operation of the windrow merger. During the operation, the guiding device is held in the lowered position.

Moreover, during transport, the guiding device must be raised.

According to an example, the actuating structure 7 also comprises a first linking element 704 and a second linking element 705. Each linking element has a first portion 704A, 705A fixed to the rod 701 and a second portion 704B, 705B articulated, respectively, to the first and to the second bar. The second portion is radially spaced from the axis of rotation Y. The first linking element 704 further includes a third portion 704C, articulated to the actuator 8, and radially spaced from the rotation axis Y.

Preferably, the third portion 704C is angularly spaced from the second portion 704B, by a predetermined angle greater than zero.

For this reason, according to an example embodiment, the first and the second portion of the linking elements provide an arm between each other which connects the rod to the levers. Moreover, according to an example, the first and the third portion of the first linking element form a further arm between each other for connecting the actuator to the rod. Moreover, the third and the second portion of the first linking element are connected together. For this reason, according to an example, the first linking element can be triangular in shape and connects the actuator to the rod and to the first bar.

According to an example, the actuator comprises a single piston-cylinder system. According to an example, the actuator is located at the first end of the rod.

The invention claimed is:

1. A windrow merger for collecting agricultural products from a field in an advancing direction, comprising:

- a frame, having a crosspiece oriented transversal to the advancing direction, and a first and a second upright fixed to the crosspiece to project upwards;

a pick up device for picking up the agricultural products;

a conveyor, connected to the frame and configured to receive the agricultural products from the pick up device and moving them in a conveying direction, oriented horizontally and transversal to the advancing direction;

a guiding device, placed upstream of the pick-up device with respect to the advancing direction and configured for guiding the agricultural products towards the conveyor, wherein the guiding device is movable between a lowered position, proximal to the pick-up device, and a raised position, distal from the pick-up device;

a support structure, for movably supporting the guiding device, the support structure including a first arm and a second arm, each having a first end connected to the guiding device and a second end articulated to the frame, so that the support structure is pivotable with respect to the frame around a pivoting axis parallel to the conveying direction;

an actuating structure including a rod extending parallel to the conveying direction between a first end a second end and rotatably connected to the first and second uprights, at the first and second end, respectively, to rotate along a rotation axis, the rotation axis being parallel to the pivoting axis, a first bar and a second of bar connected to the first arm and the second arm, respectively, each of said first and second bar being connected to the respective arm at a driving point, located between the first and the second end of the arm, and being connected to the rod, so that a rotation of the rod around the rotation axis is kinematically linked to a rotation of the support structure around the pivoting axis, through the first and the second bar;

an actuator, connected to the frame and to the rod so that a position of the actuator is kinematically linked to the angular position of the rod around the rotation axis.

2. The windrow merger according to claim 1, wherein the actuating structure further comprises a first linking element and a second linking element having a first portion fixed to the rod and a second portion articulated to the first and the second bar, respectively, the second portion being radially spaced from the rotation axis.

3. The windrow merger according to claim 2, wherein the first linking element further includes a third portion, articulated to the actuator, and radially spaced from the rotation axis.

4. The windrow merger according to claim 3, wherein the third portion is angularly spaced from the second portion, by a predetermined angle greater than zero.

5. The windrow merger according to claim 3, wherein the actuator includes a single piston-cylinder system located at the first end of the rod.

6. The windrow merger according to claim 1, wherein the actuator is a hydraulic system and includes a cylinder tube, oriented in a longitudinal direction;

a piston, positioned inside the cylinder tube to define a first chamber and a second chamber filled with oil under pressure, the first and second chambers being in fluid communication, so that the oil can move between the first and the second chamber responsive to a movement of the piston within the cylinder tube, a shaft, movable in the cylinder tube to kinematically link said position of the actuator to the angular position of the rod around the rotation axis and connected to the piston, the shaft having a first portion, positioned partly in the first chamber and partly outside the cylinder, and a second portion positioned at least partly in the second chamber, an accumulator in fluid communication with the oil contained in the first and in the second chamber.

7. The windrow merger according to claim 6, wherein the first portion of the shaft has a first diameter, and the second portion of the shaft has a second diameter, the second diameter being greater than the first diameter, so that a force is generated on the piston that biases the shaft to move backwards, in the absence of other forces.

8. The windrow merger according to claim 6, wherein the actuator includes:

a connection conduit for allowing a passage of oil between the first and the second chamber of the cylinder tube;

a throttling valve positioned in the connection conduit;

a lifting valve providing a passive unidirectional valve positioned in the connection conduit in parallel to the throttling valve, so that the oil is allowed to move from the second chamber to the first chamber through the unidirectional valve and is forced to pass through the throttling valve for moving from the first to the second chamber.

9. The windrow merger according to claim 6, wherein the actuator includes:

a connection conduit for allowing a passage of oil between the first and the second chamber of the cylinder tube;

a lowering valve, positioned in the connection conduit, and configured to be moved between an open configuration, wherein the oil can freely flow therethrough, and a blocking configuration, wherein it provides a unidirectional valve so that the oil is allowed to move only from the first chamber to the second chamber.

10. The windrow merger according to claim 6, wherein the actuator includes:

a front volume, defined inside the cylinder tube, the front volume providing the first and the second chambers;

an inner flange provided by the cylinder tube;

a rear volume, defined inside the cylinder tube and separated from the front volume by the inner flange;

a sliding annular wall, movable longitudinally in the rear volume and cooperating with the inner flange to define a third chamber, inside the rear volume, the third chamber containing further oil in communication with an oil pressure source;

a locking valve, for managing the flow of the further oil in and out from the third chamber and configured to be moved among a forward configuration, wherein the volume of the third chamber is reduced and the sliding annular wall approaches the inner flange, a backward configuration, wherein the volume of the third chamber is expanded and the sliding annular wall moves away from the inner flange, and a neutral configuration, wherein the position of the sliding annular wall is fixed, wherein the second portion of the shaft has a front end connected to the piston and rear end positioned in the rear volume, the sliding annular wall providing a stop member for the rear end of the second portion of the shaft, so to limit a forward movement of the shaft.

11. The windrow merger according to claim 1, wherein the guiding device, in the lowered position, is at a first quote from the ground, the pivoting axis being located at a second quote from the ground, a ratio between the second quote and the first quote being less than 4.

12. A method for forming windrows through a window merger which collects agricultural products from a field, comprising the following steps:

moving the windrow merger in an advancing direction;

picking up the agricultural products through a pickup device of the windrow merger;

moving the picked up agricultural products through a conveyor in a conveying direction, oriented horizontally and transversal to the advancing direction;

providing a guiding device placed upstream of the pick-up device with respect to the advancing direction, for guiding the agricultural products towards the conveyor, the guiding device being movable between a lowered position, proximal to the pick-up device, and a raised position, distal from the pick-up device;

movably supporting the guiding device by means of a support structure articulated to a frame of the windrow merger, to pivot around a pivoting axis parallel to the conveying direction;

providing an actuating structure, including a rod extending parallel to the conveying direction and rotatably connected to the frame to rotate about a rotation axis, the rotation axis being parallel to the pivoting axis, bars for connecting the support structure to the rod, an actuator, connected to the frame and to the rod, so that the movements of the guiding device between the lower position and the upper position, by rotation of the support structure around the pivoting axis, are kinematically linked to a position of the actuator through the rotation of the rod around the rotation axis.

13. The method according to claim 12, wherein the bars are articulated to linking elements fixed to opposite ends of the rod, the actuator comprising a single piston-cylinder system, placed at one of said ends of the rod ends.

14. The method according to claim 12, wherein the actuator is a hydraulic system, and comprises a cylinder tube, oriented in a longitudinal direction;

a piston, which defines within the cylinder tube a first chamber and a second chamber, in which oil under pressure moves between the first and second chambers when the piston moves inside the cylinder tube, a shaft, having a first portion, positioned partly in the first chamber and partly outside the cylinder, and a second portion positioned at least partially in the second chamber, wherein the first portion of the shaft has a first diameter, and the second portion of the shaft has a second diameter, the second diameter being greater than the first diameter, so as to generate a force to the piston which pushes the shaft to move backwards, in the absence of other forces, in which the shaft is connected to the piston, wherein, as the guiding device moves towards the lowered position, the shaft moves out of the cylinder and a transfer of oil from the first chamber to the second chamber occurs, and, as the guiding device moves towards the raised position, the shaft retracts into the cylinder and a transfer of oil occurs from the second chamber to the first chamber, the second chamber being in fluid communication with an accumulator.

15. The method according to claim 14, wherein the actuator comprises:

a connection conduit through which the oil passes between the first and second chambers of the cylinder tube;

a throttling valve placed in the connection conduit, through which the oil is forced to pass when the guiding device is lowered and the oil moves from the first chamber to the second chamber;

a lifting valve, through which the oil passes when the guiding device is lifted and the oil moves from the second chamber to the first chamber, wherein the lifting valve allows the oil to pass only from the second chamber to first chamber.

16. The method according to claim 14, wherein the actuator comprises:

a connection conduit through which the oil passes between the first and second chambers of the cylinder tube;

a lowering valve, positioned in connection conduit, and having two operating configurations, an open configuration, and a blocking configuration, so that when the lowering valve is in the open configuration, the oil is free to flow through it between the first and second chambers and, when the lowering valve is in the block configuration, the oil can pass through it only from the first chamber to the second chamber but not vice versa.

17. The method according to claim 14, wherein the actuator comprises:

a front volume, defined inside the cylinder, the front volume forming the first and second chambers;

a rear volume, defined inside the cylinder and separated from the front volume by an inner flange;

a sliding annular wall, cooperating with the inner flange to define, within the rear volume, a third chamber, wherein the sliding annular wall moves within the rear volume in response to an entrance and exit of further oil to and from the rear volume, wherein as further oil enters the third chamber, the annular wall is pushed away from the inner flange, and as further oil exits the third chamber, the annular wall moves towards the inner flange, wherein a front end of the second portion of the shaft is connected to the piston and a rear end of the second portion of the shaft is positioned in the rear volume, and wherein the sliding annular wall forms a stop member which limits a forward movement of the shaft.

18. The windrow merger according to claim 4, wherein the first and the third portion of the first linking element form a further arm between each other for connecting the actuator to the rod.

* * * * *